United States Patent
White

(10) Patent No.: US 6,207,057 B1
(45) Date of Patent: Mar. 27, 2001

(54) HOG WASTE PROCESSING APPARATUS AND METHOD

(75) Inventor: M. Charles White, Midlothian, VA (US)

(73) Assignee: Tire Recyclers, Inc., Richmond, VA (US)

( * ) Notice: Subject to any disclaimer, the term of this patent is extended or adjusted under 35 U.S.C. 154(b) by 0 days.

(21) Appl. No.: 09/364,298

(22) Filed: Jul. 30, 1999

(51) Int. Cl.$^7$ ........................................... C02F 3/00
(52) U.S. Cl. ..................... 210/609; 210/615; 210/620; 210/803
(58) Field of Search .................... 210/605, 609, 210/613, 615–617, 620, 630, 631, 618, 619, 803

(56) References Cited

U.S. PATENT DOCUMENTS

| | | | |
|---|---|---|---|
| 3,223,070 | * | 12/1965 | Gribble . |
| 3,973,043 | * | 8/1976 | Lynn ..................... 210/605 |
| 4,208,279 | * | 6/1980 | Varani ................... 210/613 |
| 5,061,369 | * | 10/1991 | Romeroe et al. . |
| 5,078,882 | * | 1/1992 | Northrup . |
| 5,470,476 | * | 11/1995 | Taboga ................... 210/615 |
| 5,569,376 | * | 10/1996 | Graves . |
| 5,817,241 | * | 10/1998 | Brayboy . |
| 5,897,785 | * | 4/1999 | Billings ................... 210/770 |
| 5,980,738 | * | 11/1999 | Heitcamp . |

OTHER PUBLICATIONS

Burk, K., "Hubcaps, Tires and Wheels: Recycling From The Ground Up," http://www.partslocator.com/services/sprofile/hubcap.htm, Mar. 1997 (downloaded Aug. 15, 2000).* http://www.pollutionengineering.com/archives/1997/pol1015.97/16idea.htm downloaded Aug. 15, 2000.* http://www.zeller–int.com/bboard/ecoblock–01.htm downloaded Aug. 15, 2000.*

* cited by examiner

Primary Examiner—Chester T. Barry

(57) ABSTRACT

A hog waste processing apparatus is comprised of standard hog barns which are fluidly connected to separators. The separators are fluidly connected to a pair of reactor cells. The reactor cells are filled with EcoBlocks to increase the surface area upon which biological reactions occur. Excess fluid from the reactor cells drains into a polishing cell which recycles the water to flush the barns. A method is also affiliated with the apparatus. The method comprises flushing the barns with water once a week to remove animal waste to the separators. Once a month the separator being used is allowed to completely dry and the solid waste is removed to a storage area for further drying and shipment.

9 Claims, 1 Drawing Sheet

HOG WASTE PROCESSING APPARATUS AND METHOD

BACKGROUND OF THE INVENTION

1. Field of the Invention

This invention pertains to a method and apparatus for processing solid waste such as created during the operation of a hog farm.

2. Description of the Prior Art and Objectives of the Invention

Hog farms are especially prevalent in about a dozen states, one being North Carolina which ranks number two in the nation and raises about 17 million hogs annually. A typical hog farm creates many tons of solid waste daily. For example, in a farm with 3,000 hogs, it is to be expected that the hogs will generate 6.3 tons a day of solid waste and currently that waste is being disposed of through dumping into lagoons and after a certain amount of sedimentation, pumping the surface water up onto farm acreage. This is an archaic way of disposing of hog waste and one that damages the environment by contaminating the ground water. It is becoming so much of an issue that most states have passed moratoriums preventing any new production hog farms and are threatening to shut down existing farms if a solution to the problem is not found.

Another environmental concern is the prevalence of waste tires which have become a problem to our society as the United States public uses approximately 250 million tires a year and has stockpiled, legally and illegally throughout the nation, approximately 6 billion tires. Tires are currently banned from landfills because they do not decompose and our country is desperately searching for environmentally friendly uses for waste tires. Currently tire are shred to make tire derived fuel (TDF), septic tank drain field use, daily landfill cover, crumb rubber and construction materials such as EcoBlocks.

With the above concerns in mind, it is an objective of the present invention to provide a method of efficiently processing solid waste collected from farms, specifically hog farms.

It is a further objective of the present invention to provide a disposal site for used tires as an alternative to land fill disposal.

It is still a further objective of the present invention to provide an apparatus which helps facilitate the processing of solid animal waste.

It is yet a further objective of the present invention to provide a method of processing solid waste using EcoBlocks made from waste tires which have been determined by the States of Virginia and North Carolina to be construction materials having economic value.

These and other objectives and advantages will become readily apparent to those skilled in the art upon reference to the following detailed description and accompanying drawing.

SUMMARY OF THE INVENTION

The process herein separates the solids from waste water when the hog barns are flushed, recovering approximately 70% of the solids in the initial phase of the process. The solids are then dried and sold for poultry feed or fertilizer, being high in nutrients. The balance of the suspended solids are ultimately removed in the holding ponds and the recycled water is not a contaminate as the water pumped from the current lagoon systems. The processed water is recycled and used to flush hog barns thereby reducing the pollutants and the odor. Any excess water can be pumped on the fields for irrigation purposes because it is nutrient rich. It is not a contaminate like the waste water that is currently pumped on the fields by permit from the lagoons.

Hog waste is conventionally collected using hog barns having slitted concrete floors about three feet above lower concrete floors at about ground level. Hogs live their entire life cycle in pens on the slitted floor and their waste is pushed by the shuffling of their feet through the slits onto the lower concrete floor. Once a week the contents in this lower floor area is flushed into a lagoon that can contaminate ground water and produce noxious odors.

The aforedescribed objectives of the invention are realized by depositing the waste upon flushing, first into a separator. The separator is approximately 11 feet wide, three feet deep and 200 feet long (3.3 m×1 m×60 m) and is positioned at an angle so that the bottom end of the separator is approximately 3.5 feet (1.2 m) lower than the top end. With use of adjustable baffles and a screen that covers the lower end, the baffles catch a majority of the solid waste while allowing the liquid to drain to reactor cells (described below). When the separator is filled with thirty days of flushings from the barns, the separator is taken out of use and the contents allowed to drain completely dry. The dry waste, which is high in protein and nutrients is mechanically removed from the separator with a front end loader or conventional back hoe and placed on a concrete apron storage area for final air drying. In the meantime, waste accumulated from the barns is routed to a second separator, which may be positioned next to or is part of the same physical structure as the first separator. It is expected that the reactor cell which receives liquid from the separator is sized to fill to capacity in approximately six months.

In the preferred embodiment, two reactor cells are utilized along with one polishing cell; each reactor cell being slightly larger than one acre and lined with a conventional non-porous polymeric liner which prevents water from escaping into the water table. About thirteen inches (13.02 cm) of dirt is placed over the polymeric liner. Atop the dirt are placed approximately 3,500 EcoBlocks. Each EcoBlock is essentially a bale of approximately 110 automobile tires. These EcoBlocks provide vast surface area on which conventional biological reactions may occur. Test results have shown that these EcoBlocks can in fact be classified as a fixed medium reactor—i.e. the surface area provides a stable environment for the generation of bacteria to break down the solid waste. Other suitable material can and from time to time will be substituted for EcoBlocks to achieve the necessary biological reaction. This is in contrast to conventional hog lagoons, which are floating medium reactors and do not generate their own supplies of bacteria in self-sustaining amounts.

Also, in the preferred embodiment, water in the reactor cells is approximately thirteen feet (4 m) deep; which is about four feet (1.3 m) above the top of the EcoBlocks. Excess water drains from the first two reactor cells to the polishing cell, which is only approximately 0.75 acre in area. Water from the polishing cell may then be used to flush the barns and any excess water can be used by the farmer to fertilize and water pastures or crops.

It should be understood that the separator liquids are pumped to the reactor cells, and as the reactor cells overflow, gravity drain to the polishing cell. Conventional pumps may be used where needed in the event gravity draining is not effective due to terrain contours or the like. Additionally, pumps may be used to move water from the polishing cell to the barn for flushing purposes. Furthermore, most hog farms have a plurality of barns, and separators are connected to all barns.

DETAILED DESCRIPTION OF THE PREFERRED EMBODIMENT AND OPERATION OF THE INVENTION

Figure 1:
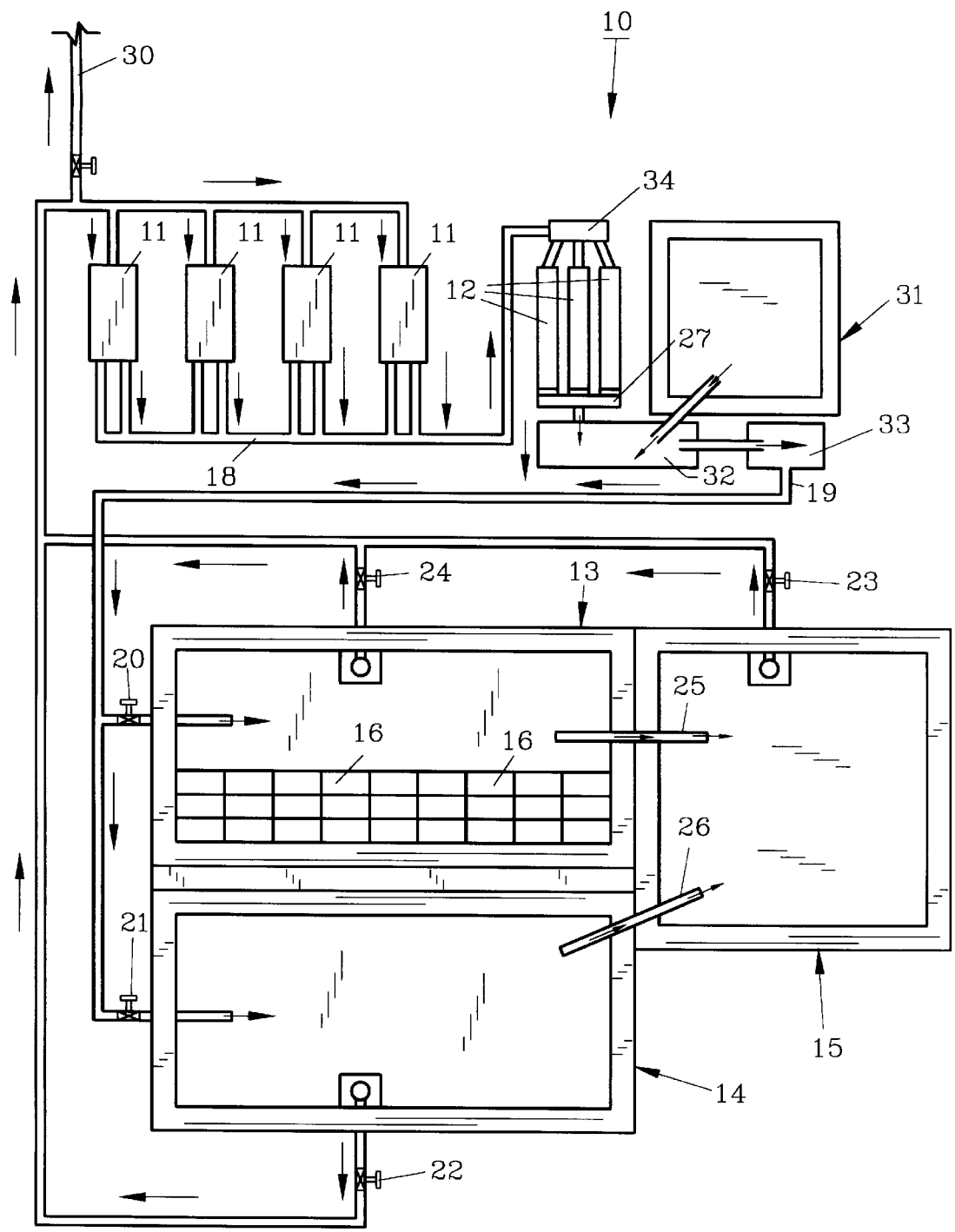
FIG. 1 shows a schematic view of the apparatus used in the present invention.

Turning now to the drawings, specifically FIG. 1 shows preferred schematic apparatus 10 which comprises plurality of conventional hog barns 11, each of which has a concrete floor or pad positioned three feet (1 m) below a slitted false floor (neither shown). A layer of water (also not shown) covers the permanent concrete pad. This pad effectively forms a storage area for deposited excrement of liquid and solid waste. While this invention is preferably directed to hogs, it can be adapted to other livestock without departing from the spirit of the invention. Hogs (not shown) create solid waste (also not shown) within barns 11 which falls through floor slits onto a water covered permanent pad or floor as conventional for storage. Once a week or sometimes more frequently, the water and waste in the storage area is flushed by water from barns 11 to separators 12 (three shown) only to be replaced by a new layer of water. This noxious effluent (waste and water) passes through conventional pipes 18 to one of separators 12. Conventional valves (not shown) may be used to prevent premature flushing. (Pumps not shown in the schematic representation of FIG. 1 may also be used).

Separators 12 are positioned at an incline such that liquid therewithin will gravity drain through the separator (with baffles and screens) to an underground 4,000 gallon tank 32. From tank 32 liquid will be pumped through the pump house 33 and pipe 19 to desired reactor cells 13 and 14. The adjustable baffles (not shown) and the conventional grate 27 prevents solid waste from passing from separators 12 into pipe 19 and reactor cells 13 and 14. The preferred dimensions of separators 12 are approximately 11 feet wide, three feet deep and 200 feet long (3.3 m×1 m×60 m). Separators 12 are positioned at an angle so that the bottom end at 32 is approximately 3.5 feet (1.2 m) lower than the top end at 34. Three separators 12 are shown for sequential use. Separators 12 are physically spaced and a valve in 34 is required to transfer the flow of effluent from one separator 12 or another. It should be understood that multiple separators are preferred and are positioned next to barns 11 near reactor cells 13 and 14.

Valves 20 and 21 control drainage from separators 12 to reactor cell 13 or 14 respectively. Approximately once a month, one of separators 12 is allowed to dry completely, and the remaining solid waste is removed mechanically by a conventional front end loader (not shown) for collecting of the solids on concrete apron storage area 31 for poultry or fertilizer producers. While the first separator 12 is being so dried, waste from barns 11 may be routed to the second or third separator 12 thus providing continual processing of the hog waste.

Reactor cells 13 and 14 are each open and slightly larger than one acre and are lined with a conventional polymeric liner, such as a polyvinyl chloride or polyester material, which prevents liquid from the cells from escaping into the water table. Standard waste lagoons are built with a clay liner, which is acceptable but does not guarantee against leakage into the water table. A polymeric membrane liner as used herein guarantees against such leakage. The liner is covered with about thirteen inches (33 cm) of dirt. This construction method is especially useful for areas in which the soil has become unstable due to heavy rains during the excavation of reactor cells 13 and 14. Atop the dirt are placed approximately 3,500 EcoBlocks 16. It should be understood that EcoBlocks 16 are also used in second reactor cell 14, but are not shown herein. EcoBlocks 16 are preferably a 4'×4'×2.5' (1.3 m×1.3 m×0.76 m) bale of approximately 100–130 waste tires bound with conventional polymeric straps, although shredded tires or other substitute materials may be used. EcoBlocks 16 provide large amounts of surface area on which natural biologic reactions occur to help process and filter the water drained from separator 12. In the preferred embodiment, the depth of the fluid within each reactor cell 13 and 14 is approximately thirteen feet (4 m) deep, and four feet (1.3 m) over the top of EcoBlocks 16. Drain pipes 25 and 26 allow excess fluid from reactor cells 13 and 14 to gravity drain into polishing cell 15 and can thus be considered overflow pipes. Additional tire material (not shown) may be positioned in reactor cells 13 and 14 to provide additional surface areas on which biological reactions may occur.

Polishing cell 15, also called a polishing pond, is open and approximately 0.75 acre in area and is lined with a layer of polymeric sheeting and dirt, as identical to reactor cells 13 and 14 described above.

Water stored in reactor cells 13, 14 and in polishing cell 15 is pumped by conventional pump and valve assemblies 24, 22 and 23 respectively, back to barns 11 for use as the weekly flushing fluid or may be used by the farmer to water and/or fertilize his fields or crops through pipe 30 since the fluid is extremely rich in nutrients and protein.

The preceding recitation is provided as an example of the preferred embodiment and is not meant to limit the nature of scope of the present invention or appended claims.

I claim:

1. A method of processing animal liquid and solid waste, said method comprising the steps of:
    a) periodically flushing an animal waste storage area with water;
    b) storing the mixture of flushed water and waste in a separator;
    c) separating the liquid from the solid waste of the mixture;
    d) forming a fixed medium reactor;
    e) submerging the fixed medium reactor in an open, liquid filled reactor cell lined with a polymeric membrane;
    f) moving liquid from the separator to the reactor cell;
    g) allowing biologic reaction to occur on said fixed medium reactor;
    h) removing solid waste from the separator; and thereafter
    i) drying said solid waste.

2. The method of claim 1 wherein said separator is positioned at an incline.

3. The method of claim 2 further comprising the step of selecting said separator from a plurality of inclined separators.

4. The method of claim 1 further comprising the step of draining liquid from the reactor cell to a polishing cell lined with a polymeric membrane.

5. The method of claim 4 wherein said draining step comprises the step of providing a gravity overflow tube from said reactor cell to said polishing cell.

6. The method of claim 1 wherein periodically flushing the animal waste storage area comprises the step of flushing the animal waste storage area once a week.

7. The method of claim 1 further comprising the step of directing liquid from the reactor cell for use in flushing step a).

8. The method of claim 1 wherein removing the solid waste from the separator comprises the step of mechanically removing the solid waste from the separator.

9. The method of claim 1 wherein forming a fixed medium reactor comprises the step of baling a plurality of vehicle tires.

* * * * *